United States Patent
Hollinger et al.

(10) Patent No.: US 11,336,513 B2
(45) Date of Patent: *May 17, 2022

(54) NETWORK NODES WITH INTELLIGENT INTEGRATION

(71) Applicant: T-Mobile USA, Inc., Bellevue, WA (US)

(72) Inventors: Ryan Hollinger, Kirkland, WA (US); Hailei Henry Cheng, Chicago, IL (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/826,571

(22) Filed: Mar. 23, 2020

(65) Prior Publication Data

US 2020/0220776 A1   Jul. 9, 2020

Related U.S. Application Data

(63) Continuation of application No. 15/213,591, filed on Jul. 19, 2016, now Pat. No. 10,601,648.

(51) Int. Cl.
*G06F 15/177* (2006.01)
*H04L 41/0806* (2022.01)
(Continued)

(52) U.S. Cl.
CPC ... *H04L 41/0806* (2013.01); *H04B 10/25891* (2020.05); *H04L 43/16* (2013.01);
(Continued)

(58) Field of Classification Search
CPC .......... H04B 10/25891; H04L 41/0806; H04L 43/0882; H04L 43/16; H04L 61/2007; H04L 67/2833; H04W 84/042
See application file for complete search history.

(56) References Cited

U.S. PATENT DOCUMENTS 5,838,907 A * 11/1998 Hansen ............... G06F 9/44505
                                                        709/220
6,105,100 A *  8/2000 Dean .................. H04L 41/0806
                                                        709/203
(Continued)

FOREIGN PATENT DOCUMENTS

CN        103026661 A     4/2013
CN        103026693 A     4/2013
(Continued)

OTHER PUBLICATIONS

Extended European Search Report dated Nov. 19, 2019 for European Patent Application No. 17831607.1, 9 pages.
(Continued)

*Primary Examiner* — Glenford J Madamba
*Assistant Examiner* — Dixon F Dabipi
(74) *Attorney, Agent, or Firm* — Lee & Hayes, P.C.

(57) ABSTRACT

The systems, devices, and techniques discussed herein are directed to commissioning network nodes as they are installed in a network. A commissioning agent can be installed in a network node prior to installing the network node in a network. When coupled to a port of an aggregation network node, the network node and/or the aggregation network node can provide an indication of a generic or private Internet protocol (IP) address to a commissioning node. The commissioning node can determine that the network node is to be initialized, and can provide commissioning files to the network node. Accordingly, the network node can configure the network node based in part on the commissioning files, including updating an IP address of the network node to a public address. Thus, network nodes can be commissioned remotely without requiring a separate provisioning channel and without requiring the network node to be configured prior to installation.

20 Claims, 7 Drawing Sheets

(51) Int. Cl.
*H04B 10/25* (2013.01)
*H04L 43/16* (2022.01)
*H04L 61/5007* (2022.01)
*H04L 67/566* (2022.01)
*H04L 43/0882* (2022.01)
*H04W 84/04* (2009.01)

(52) U.S. Cl.
CPC ...... *H04L 61/2007* (2013.01); *H04L 67/2833* (2013.01); *H04L 43/0882* (2013.01); *H04W 84/042* (2013.01)

(56) References Cited

U.S. PATENT DOCUMENTS

| | | | |
|---|---|---|---|
| 6,651,092 B1* | 11/2003 | Muraoka | H04L 29/12216 709/220 |
| 6,671,731 B1* | 12/2003 | Cain | H04L 63/0281 709/218 |
| 8,566,460 B1* | 10/2013 | Liu | H04L 67/14 709/228 |
| 9,203,774 B2 | 12/2015 | Arwe et al. | |
| 9,351,158 B2 | 5/2016 | Wright et al. | |
| 9,819,606 B2 | 11/2017 | Breiter et al. | |
| 10,313,187 B2* | 6/2019 | Finger | H04L 41/082 |
| 2002/0049693 A1* | 4/2002 | Gase | H04L 41/0889 |
| 2003/0115362 A1 | 6/2003 | Tarvainen et al. | |
| 2006/0077940 A1* | 4/2006 | Ganji | H04L 61/106 370/338 |
| 2006/0133329 A1 | 6/2006 | Lewis et al. | |
| 2008/0008179 A1 | 1/2008 | Chen et al. | |
| 2008/0137547 A1* | 6/2008 | Hauenstein | H04L 29/1232 370/252 |
| 2010/0322582 A1 | 12/2010 | Cooke et al. | |
| 2011/0007665 A1 | 1/2011 | Dinur | |
| 2011/0080267 A1 | 4/2011 | Clare et al. | |
| 2011/0115602 A1 | 5/2011 | Bhandari et al. | |
| 2011/0138384 A1* | 6/2011 | Bozek | H04L 43/0882 718/1 |
| 2011/0295978 A1* | 12/2011 | Pazos | H04N 21/26266 709/219 |
| 2011/0307589 A1 | 12/2011 | Reiss | |
| 2012/0239923 A1* | 9/2012 | Karl | H04L 63/06 713/153 |
| 2014/0006626 A1 | 1/2014 | Breiter et al. | |
| 2015/0006689 A1 | 1/2015 | Szilagyi et al. | |
| 2015/0163192 A1 | 6/2015 | Jain et al. | |
| 2016/0006607 A1* | 1/2016 | Wang | H04L 61/1582 709/222 |
| 2016/0299478 A1 | 10/2016 | Junk et al. | |
| 2017/0063685 A1* | 3/2017 | Vedantham | H04L 61/2007 |
| 2017/0366405 A1* | 12/2017 | Ganesan | G06F 9/45558 |
| 2018/0026839 A1 | 1/2018 | Hollinger et al. | |

FOREIGN PATENT DOCUMENTS

| | | |
|---|---|---|
| CN | 104040997 A | 9/2014 |
| EP | 2547043 A1 | 1/2013 |

OTHER PUBLICATIONS

Leinwand et al., "Cisco Router Configuration, Second Edition", Cisco Press, Indianapolis, 2001, 360 pages.

Office Action for U.S. Appl. No. 15/213,591, dated Jan. 11, 2018, Hollinger et al., "Network Nodes with Intelligent Integration", 30 pages.

Office Action for U.S. Appl. No. 15/213,591, dated Apr. 19, 2019, Hollinger et al., "Network Nodes with Intelligent Integration", 27 pages.

Office Action for U.S. Appl. No. 15/213,591, dated Aug. 9, 2018, Hollinger et al., "Network Nodes with Intelligent Integration", 31 pages.

International Search Report and Written Opinion dated Oct. 23, 2017 for PCT application No. PCT/US2017/042252, 9 pages.

Chinese Office Action dated Jan. 6, 2021 for Chinese patent application No. 201780044417.X, a counterpart foreign application of U.S. Appl. No. 15/213,591, 11 pages.

European Office Action dated Feb. 15, 2021 for European Patent Application No. 17831607.1, a counterpart of U.S. Pat. No. 10,601,648, 5 pages.

* cited by examiner

NETWORK NODES WITH INTELLIGENT INTEGRATION

CROSS REFERENCE TO RELATED APPLICATIONS

This application is a continuation of co-pending U.S. patent application Ser. No. 15/213,591 filed Jul. 19, 2016, entitled "Network Nodes with Intelligent Integration," which is incorporated herein by reference in its entirety.

BACKGROUND

Modern telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

The infrastructure that makes up the modern telecommunications networks comprises multiple different components or devices that are configured to transmit, receive, relay, and/or route data packets so that data services and/or content can be requested by, and provided to, client devices subscribed to a plan offered by one or more service providers or network communication providers that implement the telecommunications networks. Such components or devices must be installed and configured before the components or devices are capable of providing network communications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The systems, devices, and techniques discussed herein are directed to commissioning network nodes as they are installed in a network. Prior to physical installation at a site, a network node (such as a cell site router) can be configured with a commissioning agent associated with a generic Internet Protocol (IP) address. The network node can be installed at a site and connected to an aggregation network node via a hard-wired connection or wireless connection, such as optical fiber or microwave. The aggregation network node can provide an indication to a commissioning node of a physical port coupled to the network node, and in response, the commissioning node can access a backend database to determine design data to be associated with the network node. The commissioning node can commission the network node by transmitting commissioning files to the network node. The network node can configure the network node based in part on the commissioning files, including updating an IP address of the network node to a public address. Further, the aggregation network node can update a routing table including an address associated with the network node, and the network node may be used for communication in the network. Thus, network nodes can be commissioned remotely without requiring a separate provisioning channel and without requiring the network node to be configured prior to installation.

In various embodiments, the commissioning agent installed on the network node can include basic functionality to establish communication with an aggregation network node after being installed and physically connected to the aggregation network node during installation. After a connection is established with a commissioning node, the commissioning node can provide the commissioning files to the network node via the aggregation network node to configure the network node for network communications. In some instances, the commissioning files can include, but are not limited to, addressing information, installation site information, neighboring node information, communication protocols, tagging information, etc.

The systems, devices, and techniques described herein can be implemented in a number of ways. Example implementations are provided below with reference to the following figures.

Figure 1:
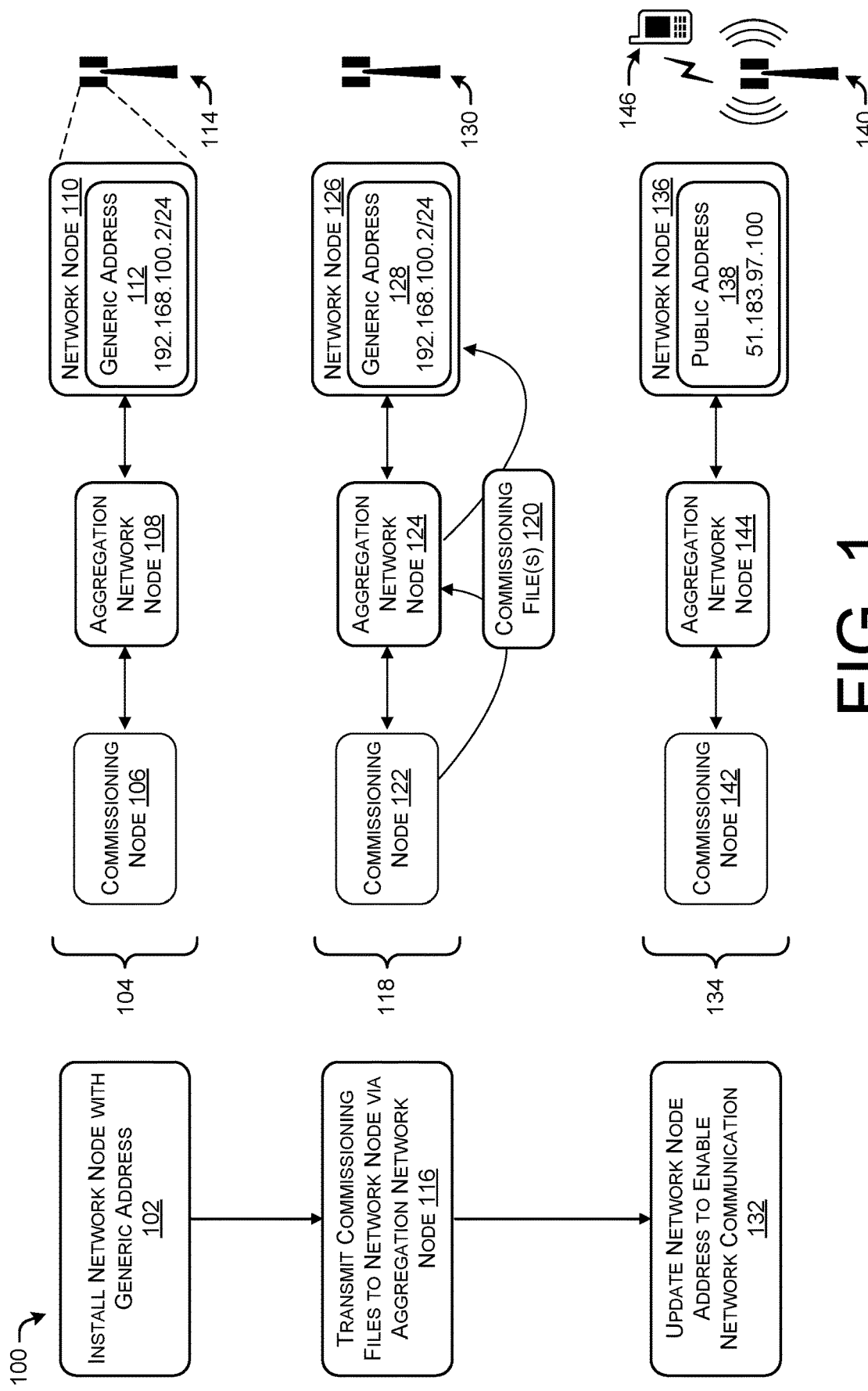
FIG. 1 illustrates a pictorial flow diagram of a process for provisioning a network node for network communications.

FIG. 1 illustrates a pictorial flow diagram 100 of a process for provisioning a network node for network communications. FIG. 1 illustrates a high-level pictorial flow diagram, and additional details of the implementation are given throughout this disclosure.

At 102, the operation can include installing a network node with a generic address. An example of a network after an initial installation is illustrated as example 104, including a commissioning node 106, an aggregation network node 108, and a network node 110 (including a generic address 112). Further, the network node 110 is also illustrated as a network node 114.

The generic address 112 illustrated in example 104 is a private Internet Protocol (IP) address of 192.168.100.2/24. As may be understood in the context of this disclosure, any generic address and/or private address can be assigned to the network node 110. In some instances, the generic address 112 can be assigned to a plurality of network nodes as a default network address prior to installation.

The network node 110 can be installed at virtually any location, including, but not limited to, office buildings, sports stadiums, concert venues, etc. Further, to improve a transmission range or coverage area, the network nodes are often installed in hard-to-reach locations such as on utility poles (e.g. as illustrated as the network node 114) or towers. In some instances, the network node can be installed by a technician at a location, for example, via an installation bracket. In some instances, inputs to the network node 110 can include a hard-wired connection (such as copper Ethernet connection or an optical fiber cable) and electrical power. In some instances, inputs to the network node can include a wireless connection, such as Wi-Fi or a microwave connection. In some instances after installation (e.g., prior to commissioning), the network node 114 may not be configured to provide network communications, in which case, the network node 114 would not wirelessly transmit or receive network communications (e.g., to client devices).

Further, the operation 102 can include establishing a connection between the network node 110, the aggregation network node 108, and the commissioning node 106. In some instances, the aggregation network node 108 (e.g., a router) can provide an indication to the commissioning node 106 that the network node 110 has been connected to the aggregation network node 108.

At 116, the operation can include transmitting commissioning files to the network node via the aggregation network node. In an example 118, commissioning file(s) 120 are illustrated as being transferred from a commissioning node 122 via an aggregation network node 124 to a network node 126. Further, at this time, the network node 126 can still be configured with a generic address 128. In some instances, a network node 130 illustrates that the network node 130 is not conducting wireless transmissions for network communications, for example.

In some instances, the commissioning files 120 can include data, parameters, settings, software updates, etc. to initialize the network node 126 to facilitate network communications.

At 132, the operations can include updating the network node address to enable network communications via the network node. In an example 134, a network node 136 is illustrated as including a public address 138, which may include an IP address unique to the network node 136. For example, the public address 138 is illustrated as an IP address of 51.183.97.100, although it may be appreciated that any available IP address may be used instead. In some instances, after the network node 136 is updated with the public address 138, the network node 136 may facilitate network communications, illustrated as a network node 140 transmitting and receiving wireless communications. Example 134 also includes a commissioning node 142 and an aggregation network node 144, which may provide network communications in connection with the network node 136, for example. In some instances, the network node 140 is enabled to provide network communications between the network node 140 and a client device 146, for example.

Figure 2:
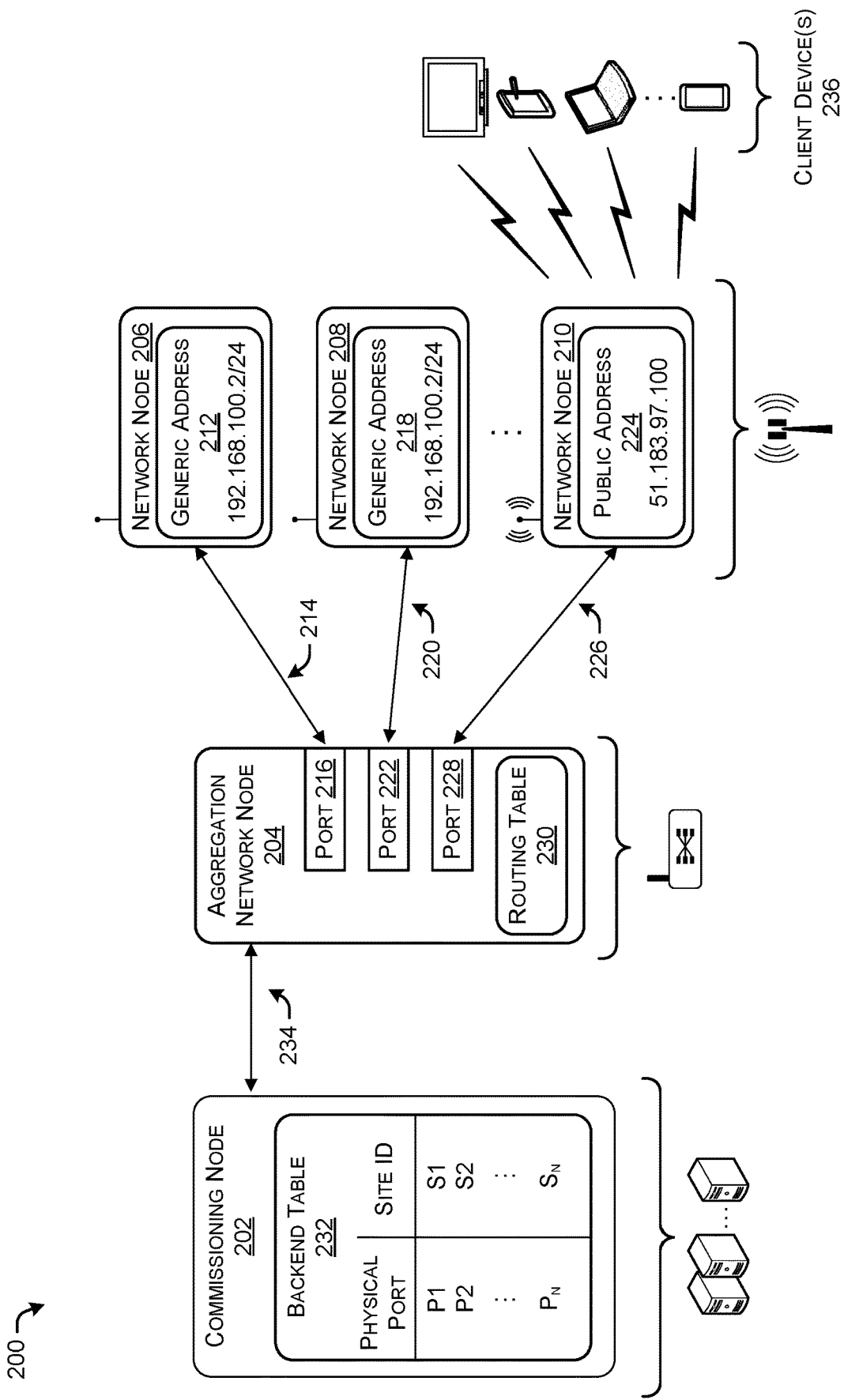
FIG. 2 illustrates an example environment for provisioning a network node in a network including a commissioning node, an aggregation network node, and the network node.

FIG. 2 illustrates an example environment 200 for provisioning a network node in a network including a commissioning node 202, an aggregation network node 204, and network nodes 206, 208, and 210. In some instances, the commissioning node 202 can correspond to the commissioning nodes 106, 122, and 142 of FIG. 1. In some instances, the aggregation network node 204 can correspond to the aggregation network nodes 108, 124, and 144 of FIG. 1. In some instances, the network nodes 206, 208, and 210 can correspond to the network nodes 110 and 126 in FIG. 1.

The network node 206 can be configured with a generic address 212, and upon installation, can be coupled to the aggregation network node 204 via a dedicated network connection 214. The network connection 214 can be an optical fiber link, an Ethernet link, a microwave link, etc. In some instances, the network connection 214 can be coupled with a port 216 of the aggregation network node 204, such that the network node 206 is uniquely associated with the port 216. Similarly, the network node 208 can be configured with a generic address 218 and coupled with the aggregation network node 204 via a dedicated network connection 220 via a port 222. The network node 210 can be configured with a public address 224 and coupled with the aggregation network node 204 via a dedicated network connection 226 via a port 228. In some instances, the generic addresses 212 and 218 can be identical addresses, such that the addresses do not distinguish between the network nodes 206 and 208, respectively. In some instances, the network node 210 can be configured to conduct network communications with one or more client devices 236.

The aggregation network node 204 can include a routing table 230 that includes an association between the ports 216, 222, 228 of the aggregation network node 204 and the network nodes 206, 208, and 210, respectively. In some instances, the routing table 230 can be updated as network nodes are connected or disconnected to or from the aggregation network node 204. In some instances, the routing table 230 can include additional information about one or more of the network nodes 206, 208, and 210, relating to, for example, a physical location of the network nodes 206, 208, and 210 (e.g., latitude/longitude, location within a building, etc.), software version, network communication capability, etc. In some instances, the aggregation network node 204 can provide information from the routing table 230 to the commissioning node 202.

The commissioning node 202 can include a backend table 232 that can track network devices within the environment 200, including the aggregation network node 204 and any network nodes 206, 208, and 210 coupled with the aggregation network node 204. For example, the backend table 232 can store indications of the physical ports within the aggregation network node 204 as well as a physical site corresponding to the ports. Further, the backend table 232 can include additional information, including but not limited to IP addresses, network communication capabilities, ping times, Quality of Services (QoS) associated with network nodes, etc. For example, an entry in the backend table 232 may include an association of port 216 with the network node 206 and the generic address 212. Further, the entry may include a latitude and longitude associated with the network node 206, and/or a latitude and longitude corresponding to the coverage area of the network node 206. In some instances, the backend table 232 can be updated as network devices are added or removed from the network. In some instances, the backend table 232 can store indications of whether network nodes have been commissioned, in accordance with embodiments of the disclosure. Further, the commissioning node 202 can communicate with the aggregation network node 204 via a network connection 234.

In some instances, the network connection 234 can be any type of wired or wireless connection, such as a backhaul network or the Internet. In some embodiments, the network connection 234 can comprise a mobile telecommunications network (MTN) configured to implement one or more of the second, third, and fourth generation (2G, 3G, and 4G) cellular-wireless access technologies discussed above. Thus, the MTN can implement GSM, UMTS, and/or LTE/LTE Advanced telecommunications technologies. For example, the environment 200 implementing the GSM, UMTS, LTE, LTE Advanced, and/or HSPA+ telecommunications technologies can include, but are not limited to, a combination of: base transceiver stations BTSs (e.g., NodeBs, Enhanced-NodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), or any other data traffic control entity configured to communicate, convert, and/or route data packets between the commissioning node 202, the aggregation network node 204, the network nodes 206, 208, and 210, and ultimately to one or more client devices 236. Further, it is understood in the context of this disclosure that the techniques discussed herein can also be implemented in other networking technologies, such as nodes that are part of a wide area network (WAN), metropolitan area network (MAN), local area network (LAN), neighborhood area network (NAN), personal area network (PAN), or the like.

As mentioned above, the network nodes 206, 208, and/or 210 can be enabled to provide network communications for one or more client devices 236, which can be any sort of device capable of engaging in wireless communication with other, remote devices. For example, the client devices 236 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over the network connections 234, 214, 220, and/or 226.

Figure 3:
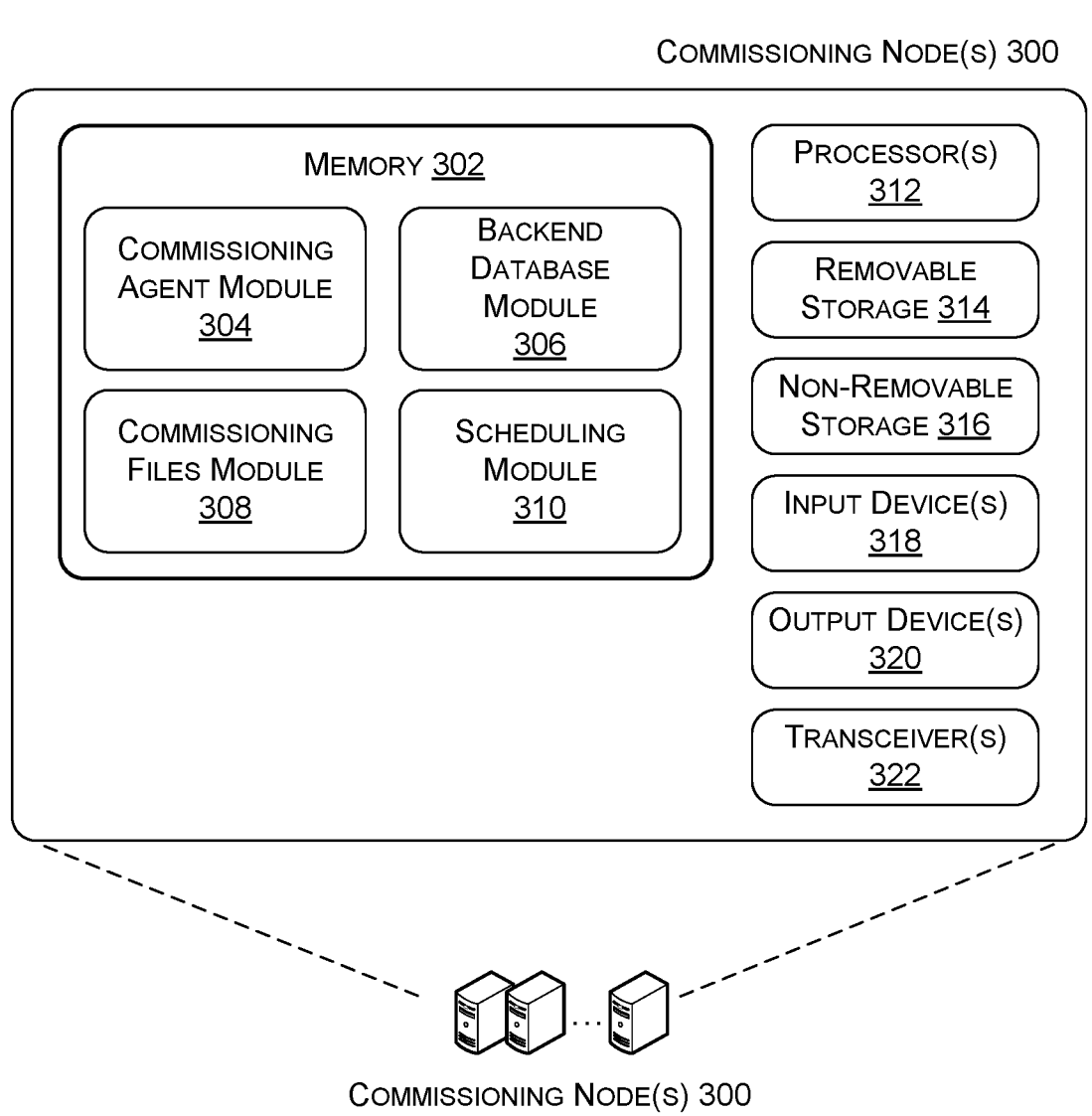
FIG. 3 illustrates an example commissioning node configured to provision network nodes, in accordance with embodiments of the disclosure.

FIG. 3 illustrates an example commissioning node 300 configured to provision network nodes, in accordance with embodiments of the disclosure. In some embodiments, the commissioning node 300 can correspond to the commissioning nodes 106, 122, 142, and 202 of FIGS. 1 and 2, respectively. It is to be understood in the context of this disclosure that the commissioning node 300 can be implemented as a single device or as a plurality of devices with modules and data distributed among them. For example, a commissioning agent module 304, a backend database module 306, a commissioning files module 308, and/or a scheduling module 310 can be implemented on different devices 300 of the commissioning nodes 106, 122, 142, and/or 202.

As illustrated, the network provider 300 comprises a memory 302 storing the commissioning agent module 304, the backend database module 306, the commissioning files module 308, and the scheduling module 310. Also, the network provider 300 includes processor(s) 312, a removable storage 314 and non-removable storage 316, input device(s) 318, output device(s) 320, and transceiver(s) 322.

In various embodiments, memory 302 is volatile (such as RAM), nonvolatile (such as ROM, flash memory, etc.) or some combination of the two. The commissioning agent module 304, the backend database module 306, the commissioning files module 308, and the scheduling module 310 stored in the memory 302 can comprise methods, threads, processes, applications or any other sort of executable instructions. The commissioning agent module 304, the backend database module 306, the commissioning files module 308, and the scheduling module 310 can also include files and databases.

The commissioning agent module 304 can perform operations to detect a connection of a network node to a network and can initiate commissioning operations discussed herein. In some instances, the commissioning agent module 304 can receive an indication from an aggregation network node that an uncommissioned network node has been added to the network. In some instances, the commissioning agent module 304 can receive an indication of a generic IP address associated with a port of an aggregation network node, and based on the indication and/or on the generic IP address, determine that the network node is to be commissioned.

The backend database module 306 can correspond to the backend table 232 of FIG. 2. For example, the backend database module 304 can track devices as they are connected to and removed from the network. Further, the backend database module 306 can store one or more indications associated with each network device indicating whether the network device has been commissioned. The backend database module 306 can include indications regarding each aggregation node (e.g., the aggregation network node 204) within the network, as well as indications of ports of the aggregation network node and a network node associated with the ports. The backend database module 306 can be updated as devices are added and removed from the network.

The commissioning files module 308 can store one or more commissioning files (e.g., the commissioning files 120) that are provided to the network node upon installation. For example, the commissioning files module 308 can store initialization files that are to be transmitted to an aggregation network node (e.g., the aggregation network node 204) to be pushed to a respective network node. In some instances, the commissioning files to be transmitted to the network node can be configured for the network node, based at least in part on location information stored in the backend database module 306. That is, the commissioning files can be specific to various network nodes, such that an operation of a network node can be optimized upon installation of various commissioning files from the commissioning files module 308.

The scheduling module 310 can determine one or more times at which to transfer commissioning files to a network node, for example. In some instances, the scheduling module 310 can schedule transmission to a single network node, while in some instances, the scheduling module 310 can schedule transmissions to one or more network nodes at a particular time. For example, the scheduling module 310 can schedule a plurality of transmissions for a plurality of network nodes at a same aggregation network node or different aggregation network nodes. In some instances, the scheduling module 310 can transmit commissioning files upon a request by an aggregation network node or network node (or upon receiving an indication that a network node has been added to a network), while in some instances, the scheduling module 308 can schedule transmissions at a time when activity of a network is below a threshold or at a time at which activity is expected to be low (e.g., at night). In some instances, the scheduling module 310 can schedule one or more transmissions based upon a priority of commissioning a particular network node.

In some embodiments, the processor(s) 312 is a central processing unit (CPU), a graphics processing unit (GPU), or both CPU and GPU, or other processing unit or component known in the art.

The network provider 300 also includes additional data storage devices (removable and/or non-removable) such as, for example, magnetic disks, optical disks, or tape. Such additional storage is illustrated in FIG. 3 by removable storage 314 and non-removable storage 316. Tangible computer-readable media can include volatile and nonvolatile, removable and non-removable media implemented in any method or technology for storage of information, such as computer readable instructions, data structures, program modules, or other data. Memory 302, removable storage 314 and non-removable storage 316 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the commissioning node 300. Any such tangible computer-readable media can be part of the commissioning node 300.

The commissioning node 300 also can include input device(s) 318, such as a keypad, a cursor control, a touch-sensitive display, voice input device, etc., and output device(s) 320 such as a display, speakers, printers, etc. These devices are well known in the art and need not be discussed at length here.

As illustrated in FIG. 3, the commissioning node 300 also includes one or more wired or wireless transceiver(s) 322. For example, the transceiver(s) 322 can include a network interface card (NIC), a network adapter, a LAN adapter, or a physical, virtual, or logical address to connect to the network connections 234, or the aggregation network node 204, the network nodes 206, 208, and 210, or the client devices 236, for example. To increase throughput when exchanging wireless data, the transceivers 322 can utilize multiple-input/multiple-output (MIMO) technology. The transceiver(s) 322 can comprise any sort of wireless transceivers capable of engaging in wireless, radio frequency (RF) communication. The transceivers 322 can also include other wireless modems, such as a modem for engaging in Wi-Fi, WiMax, Bluetooth, or infrared communication.

Figure 4:
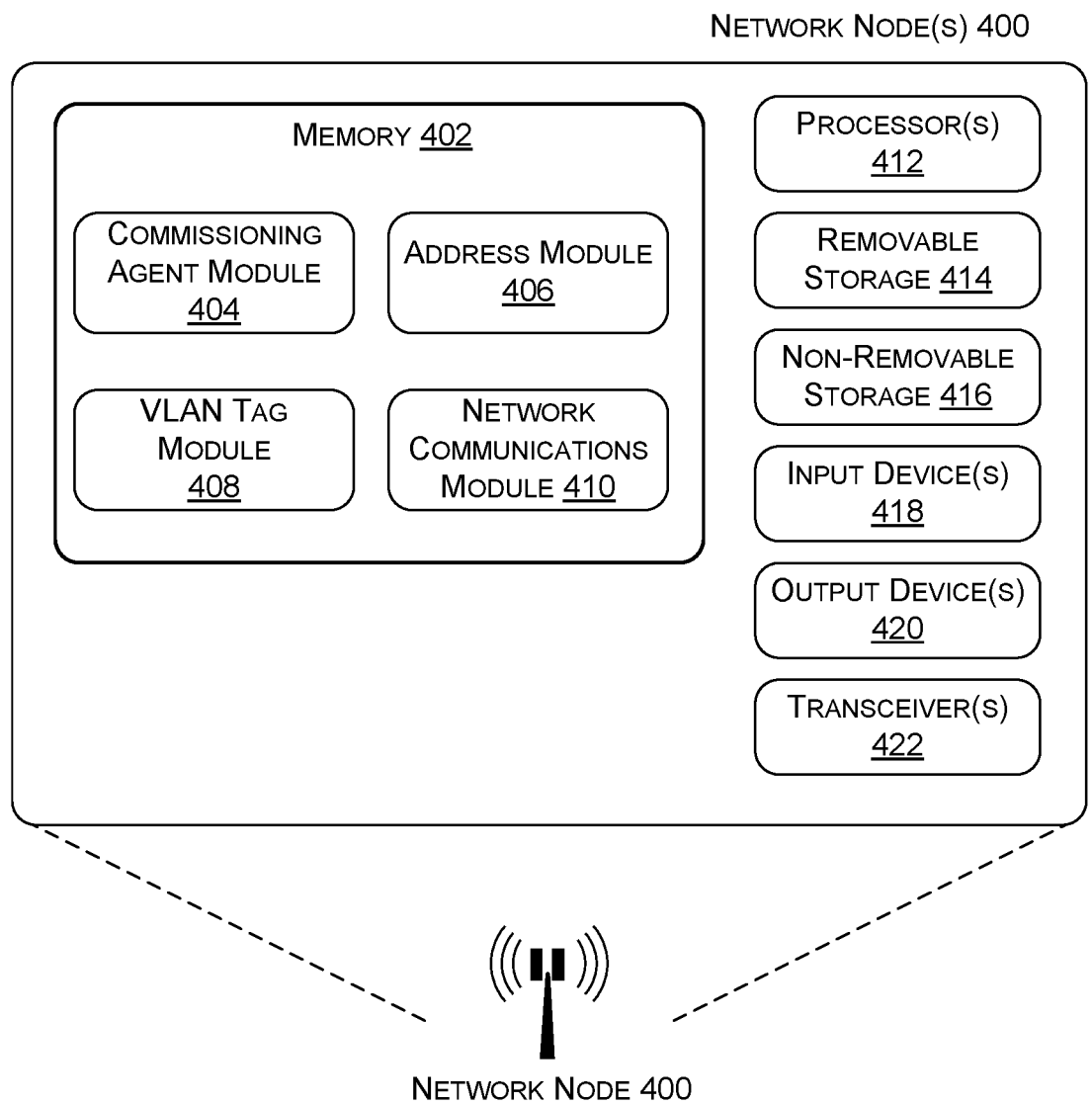
FIG. 4 illustrates an example network node configured to be remotely provisioned for network communications, in accordance with embodiments of the disclosure.

FIG. 4 illustrates an example network node 400 configured to be remotely provisioned for network communications, in accordance with embodiments of the disclosure. In some embodiments, the network node 400 can correspond to the network nodes 110, 126, 136, 206, 208, and 210 of FIGS. 1 and 2, respectively. As illustrated, the network node 400 comprises a memory 402 storing a commissioning agent module 404, an address module 406, a VLAN tag module 408, and a network communications module 410. Also, the network node 400 includes processor(s) 412, a removable storage 414 and non-removable storage 416, input device(s) 418, output device(s) 420, and transceiver(s) 422.

In various embodiments, memory 402 is volatile (such as RAM), nonvolatile (such as ROM, flash memory, etc.) or some combination of the two. The commissioning agent module 404, the address module 406, the VLAN tag module 408, and the network communications module 410 stored in the memory 402 can comprise methods, threads, processes, applications or any other sort of executable instructions. The commissioning agent module 404, the address module 406, the VLAN tag module 408, and the network communications module 410 can also include files and databases.

In some embodiments, the module operations in the network node 400 can be performed in parallel with the module operations in the commissioning node 300. In some embodiments, various modules can be used to check the processing determined by the other modules.

In some embodiments, the commissioning agent module 404 can perform operations to initiate the commissioning operations discussed herein. For example, upon connecting the network node 400 to an aggregation network node (e.g., via a dedicated network connection), and upon connecting the network node 400 to a power supply, the commission agent module 404 can provide an indication to the aggregation network node (e.g., the aggregation network node 204) as an express message or in the form of a generic IP address. The commission agent module 404 can further receive one or more commissioning files from the aggregation network node, for example, and can update aspects and/or parameters of the network node 400 as part of commissioning the network node 400. In some instances, the commissioning agent module 404 can perform operations to commission the network node 400 over the dedicated network communication channel provided to the network node 400 (e.g., one of the network connections 214, 220, and 226) without requiring a separate provisioning channel, such as a wireless provisioning channel. Further, the provisioning discussed herein can be performed remotely without requiring a network technician to be present at the network node 400.

In some embodiments, the address module 406 can identify the network node 400 using one or more IP addresses, in accordance with embodiments of the disclosure. At a time prior to the network node 400 being installed at a location, the address module 406 can include a generic IP address. In response to commissioning files being transmitted to the network node 400, the address module 406 can update an IP address of the network node 400 to uniquely identify the network node 400 for network communications. In some instances, the address module 406 can change an IP address of the network node 400 to indicate an error condition with the network node 400, for example.

In some embodiments, the VLAN tag module 408 can operate to set a VLAN (virtual local area network) tag for the network node 400 to improve routing of network communications (when enabled) between the network and one or more client devices associated with the network node 400. In some instances, the VLAN tag module 408 can be set in response to receiving one or more configuration files from the commissioning node. In some instances, the VLAN tag module 408 can insert an associated VLAN tag into one or more data packets associated with the network node 400.

In some embodiments, the network communications module 410 can be enabled to provide network communications to one or more client devices coupled with the network node 400. For example, after one or more commissioning files have been received by the network node 400 and an address of the address module 406 has been updated with a public address, the network communications module 410 can be enabled to provide wireless communications. The network communications module 410 can transmit and/or receive packet-based communications and/or data to and from a plurality of client devices.

In some embodiments, the processor(s) 412 is a central processing unit (CPU), a graphics processing unit (GPU), or both CPU and GPU, or other processing unit or component known in the art.

The network node 400 also includes additional data storage devices (removable and/or non-removable) such as, for example, magnetic disks, optical disks, or tape. Such additional storage is illustrated in FIG. 4 by removable storage 414 and non-removable storage 416. Tangible computer-readable media can include volatile and nonvolatile, removable and non-removable media implemented in any method or technology for storage of information, such as computer readable instructions, data structures, program modules, or other data. Memory 402, removable storage 414 and non-removable storage 416 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the network node 400. Any such tangible computer-readable media can be part of the network node 400.

The network node 400 can include input device(s) 418, such as a keypad, a cursor control, a touch-sensitive display, etc. Also, the client device 400 can include output device(s) 420, such as a display, speakers, etc. These devices are well known in the art and need not be discussed at length here.

As illustrated in FIG. 4, the network node 400 can include one or more wired or wireless transceiver(s) 422. In some wireless embodiments, to increase throughput, the transceiver(s) 422 can utilize multiple-input/multiple-output (MIMO) technology. The transceiver(s) 422 can be any sort of wireless transceivers capable of engaging in wireless, radio frequency (RF) communication. The transceiver(s) 422 can also include other wireless modems, such as a modem for engaging in Wi-Fi, WiMax, Bluetooth, microwave, or infrared communication.

Figure 5:
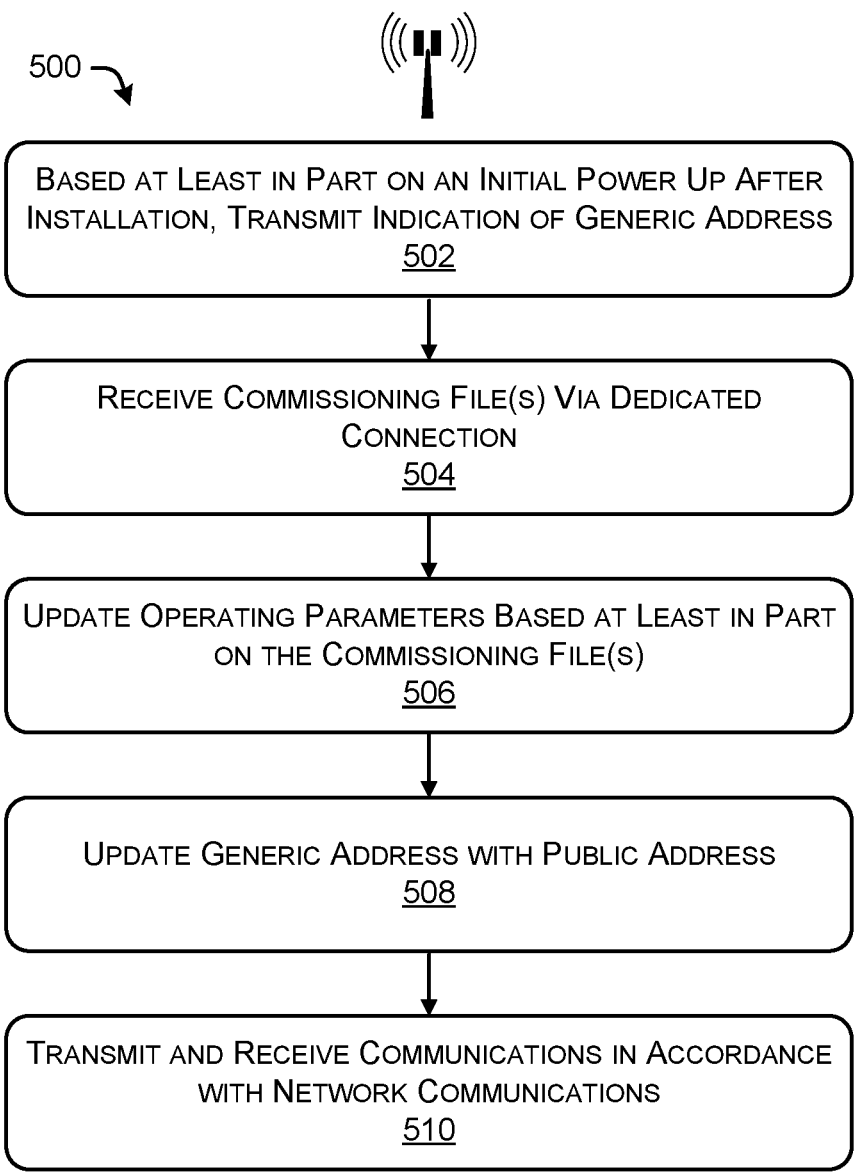
FIG. 5 illustrates an example process for provisioning a network node upon an initial power up after installation, in accordance with embodiments of the disclosure.
Figure 6:
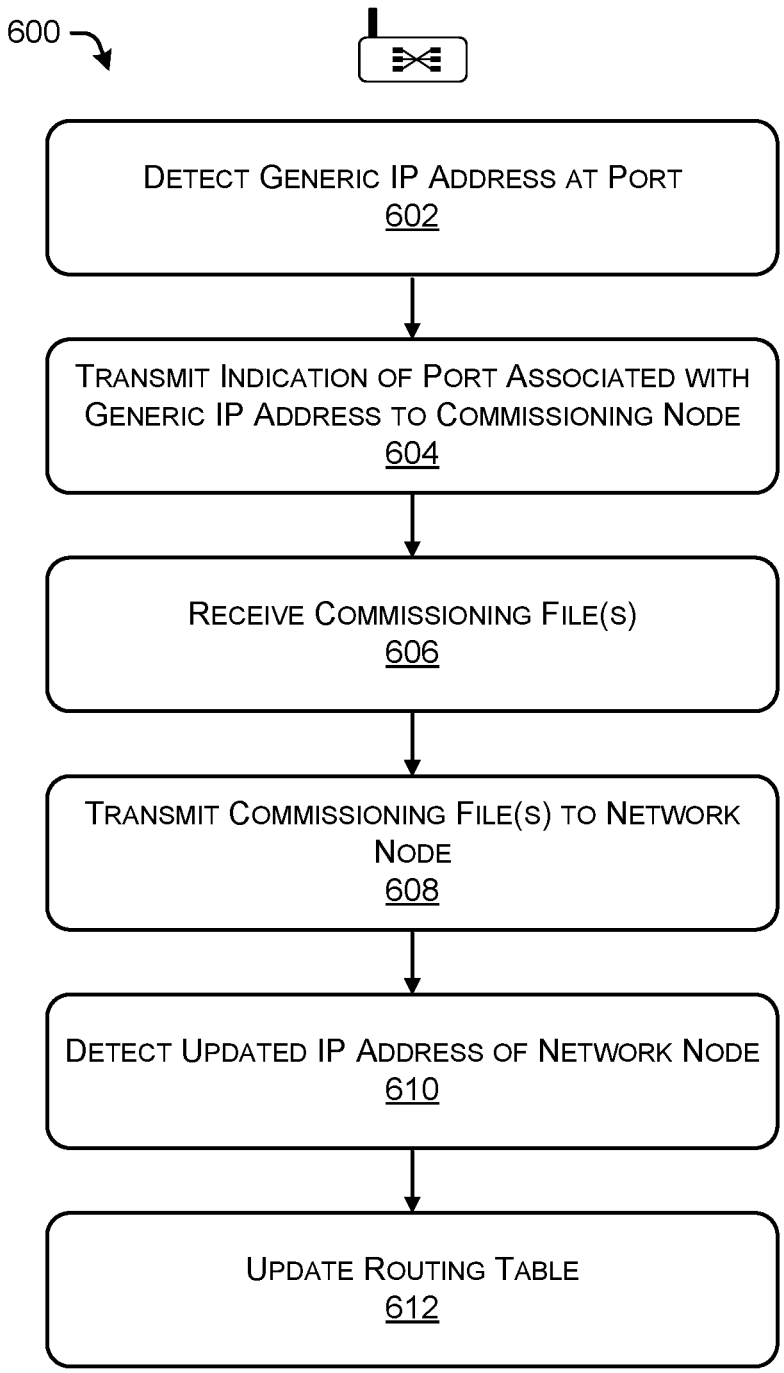
FIG. 6 illustrates an example process for an aggregation network node to facilitate the provisioning of a network node for network communications, in accordance with embodiments of the disclosure.
Figure 7:
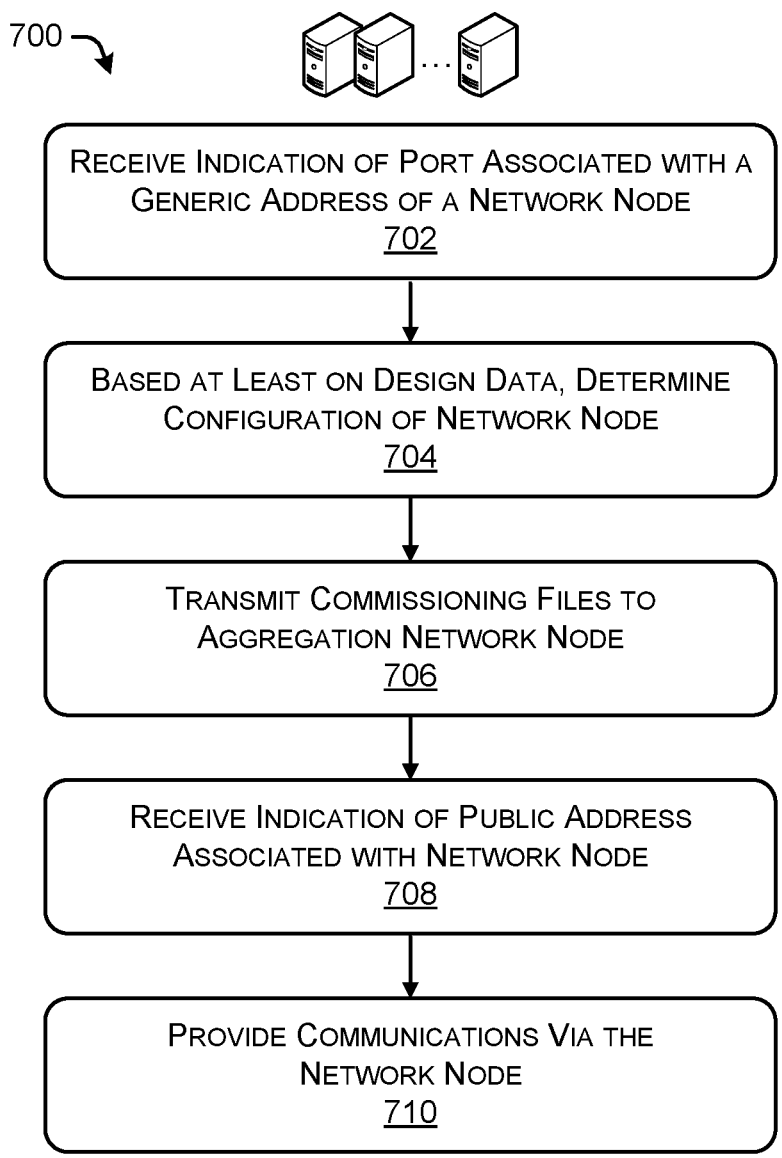
FIG. 7 illustrates an example process for a commissioning node to provision a network node for network communications, in accordance with embodiments of the disclosure.

FIGS. 5-7 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process 500 for provisioning a network node upon an initial power up after installation, in accordance with embodiments of the disclosure. The example process 500 can be performed by the network nodes 110, 126, 136, 206, 208, 210, and/or 400 of FIGS. 1, 2, and 4, for example.

At 502, the operation can include transmitting an indication of a generic address upon an initial power up after installation. For example, a network node can be configured with a generic IP address prior to installation, and when connected to a dedicated network connection and provided with power, a network node can provide an indication to an aggregation network node of the generic address associated with the network node. In some instances, based on the generic IP address associated with the network node, the network node may not be capable of communicating with any devices independent of the aggregation network node. For example, the network node may not be configured to provide network communications to one or more client devices when configured with the generic IP address.

At 504, the operation can include receiving commissioning file(s) via a dedicated connection. For example, a network node can receive commissioning files via an aggregation network node from a commissioning node. In some examples, the commissioning files are received in response to providing an indication of the generic address to the aggregation network node and/or commissioning node. In some instances, the commissioning files are received via a same channel that is subsequently used for network communications. That is, in some instances, a separate provisioning channel is not needed for the network node. In some instances, the commissioning files are addressed to a port of the aggregation network node where the network node is coupled, with the aggregation network node providing the commissioning files to the network node.

At 506, the operation can include updating operating parameters in the network node based at least in part on the commissioning file(s). For example, the commissioning files can include descriptions and/or instructions on how to configure a network node for a particular location for network communications. In some instances, a network node can be configured to transition communications between groups of network nodes connected to an aggregation network node. In some instances, commissioning files can set a power level, latency, bandwidth, noise level thresholds, etc., relating to an operation of the network node.

At 508, the operation can include updating the generic address of the network node with a public address. For example, the public address can uniquely identify the network node, while the generic address can be pre-installed for initial commissioning operations.

At 510, the operation can include transmitting and receiving communications in accordance with network communications. In some instances, a network node can be disabled from providing network communications until the network node is commissioned for communications and the address of the network node is updated as a public address. After the network node is commissioned and a public address is provided to the network node, wireless capabilities of the network node can be activated and communications can be provided, for example, in the operations 510.

FIG. 6 illustrates an example process 600 for an aggregation network node to facilitate the provisioning of a network node for network communications, in accordance with embodiments of the disclosure. The example process 600 can be performed by the aggregation network nodes 108, 124, 144, and/or 204 of FIGS. 1 and 2, for example.

At 602, the operation can include detecting a generic IP address at a port of the aggregation network node. For example, the operation 602 can include connecting a network node to the aggregation network node via a dedicated network connection. In some instances, one network node can be connected to the port, in which case, the port may be uniquely associated with the aggregation network node port. The aggregation network node can poll the network node to determine the generic IP address, or the network node can push an indication of the generic IP address to the aggregation network node. In some instances, the operation 602 can be performed in response to powering on a network node connected to the aggregation network node via a port.

At 604, the operation can include transmitting an indication of the port associated with the generic IP address to a commissioning node. In some instances, the aggregation network node can transmit this indication to the commissioning node in response to detecting the network node being connected to the aggregation network node. Further, this operation can include transmitting to the commissioning node information relating to a topology of the aggregation network node and/or indications of any other network nodes coupled with the aggregation network node.

At 606, the operation can include receiving one or more commissioning files from the commissioning node. For example, the commissioning files can be received in response to the indication provided in the operation 604. In some instances, the commissioning files can be addressed to the aggregation network node, and more particularly, to a port of the aggregation network node uniquely associated with the network node. In some instances, the commissioning files may be addressed independent of the generic IP address.

At 608, the operation can include transmitting the commissioning file(s) to the network node connected to the aggregation network node. As the network node can be associated with a generic IP address at this point, the aggregation network node can transmit the commissioning files to the network node based in part on the commissioning files being intended for a particular port of the aggregation network node.

At 610, the operation can include detecting an updated IP address of the network node. For example, the network node can update a network address of the network node and provide an indication of the updated IP address to the aggregation network node.

At 612, the operation can include updating a routing table of the aggregation network node, which may include updated the IP address associated with a particular port of the aggregation network node. In this manner, the aggregation network node can facilitate the network communications by and between the aggregation network node, the network node, the commissioning node, and one or more client devices.

FIG. 7 illustrates an example process 700 for a commissioning node to provision a network node for network communications, in accordance with embodiments of the disclosure. In some embodiments, the process 700 can be performed by the commissioning nodes 106, 122, 142, 202, and 300, for example.

At 702, the operation can include receiving an indication of a port associated with a generic address of a network node. In some instances, the indication can be provided by the aggregation network node to the commissioning node. In some instances, the indication can include an identification of the aggregation network node, a port associated with the aggregation network node, and/or a generic IP address associated with the port.

At 704, the operation can include determining a configuration of a network node, based at least on design data associated with the network node. In some instances, the design data associated with a network node can be a location of the network node (e.g., latitude and longitude), a bandwidth associated with the network node, a communication technology (e.g., 3G, 4G, LTE, etc.), a transmission power of the network node, a coverage area associated with the network node, etc. In some instances, the design data can be incorporated into the commissioning files and, at 706, the operation can include transmitting the commissioning files to an aggregation network node, whereby the aggregation network node can provide the commissioning files to a designated port of the aggregation network node. In some instances, because the network node is associated with a generic IP address, the commissioning files are directed to a particular port of the aggregation network node rather than to a network node itself.

At 708, the operation can include receiving an indication of a public address associated with the network node. This indication can be transmitted by the network node and received at the commissioning node, indicating to the commissioning node that the network node is enable to provide network communications. At 710, the operation can include providing communications via the network node. For example, voice and/or data based communications can be subject to network communications.

Thus, network nodes can be commissioned remotely without requiring a separate provisioning channel and without requiring the network node to be configured prior to installation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
a memory; and
one or more modules stored in the memory and executable by the one or more processors to perform operations comprising:
receiving a first indication of a network node coupled to a port of an aggregation network node, the network node associated with a generic Internet protocol (IP) address, wherein the generic IP address is a private IP address, wherein the generic IP address is assignable to the network node and a second network node at the same time;
determining at least one commissioning file to initialize the network node for network communications, the at least one commissioning file including initialization information associated with a location of the network node;
providing the at least one commissioning file to the aggregation network node associated with the network node;
receiving a second indication that the network node has updated an address of the network node from the generic IP address to a public address to enable network communications based at least in part on the at least one commissioning file; and
communicating with the network node to provide the network communications.

2. The system of claim 1, the operations further comprising:
providing the at least one commissioning file to the network node via an optical fiber network connection; and
communicating with the network node to provide the network communications via the optical fiber network connection.

3. The system of claim 1, the operations further comprising scheduling the providing of the at least one commissioning file to the aggregation network node at a time in which a bandwidth of the aggregation network node is below a bandwidth threshold.

4. The system of claim 1, wherein the network node is a first network node, the operations further comprising:
determining that a second network node is associated with the aggregation network node, the second network node associated with the generic IP address; and
providing the at least one commissioning file to the first network node based at least in part on the port of the aggregation network node associated with the first network node.

5. A non-transitory computer-readable storage medium having computer-executable instructions stored thereupon that, when executed by a computer, cause the computer to perform acts comprising:
 receiving a first indication that a network node is coupled to a port of an aggregation network node, the network node associated with a generic Internet protocol (IP) address, wherein the generic IP address is a private IP address, wherein the generic IP address is assignable to the network node and a second network node at the same time;
 determining at least one commissioning file, the at least one commissioning file including initialization information associated with a physical location of the network node;
 providing, based at least in part on the generic IP address, the at least one commissioning file to the aggregation network node associated with the network node;
 receiving a second indication that the network node has updated an address of the network node from the generic IP address to a public address to enable network communications based at least in part on the at least one commissioning file; and
 communicating with the network node to provide network communications.

6. The non-transitory computer-readable storage medium of claim 5, the acts further comprising determining that the address of the network node corresponds to the public IP address.

7. The non-transitory computer-readable storage medium of claim 5, wherein the network node is coupled to the aggregation network node via an optical fiber network connection, and wherein the port of the aggregation network node uniquely identifies the network node.

8. The non-transitory computer-readable storage medium of claim 5, the acts further comprising determining that the address of the network node indicates that the network node is enabled for the network communications.

9. The non-transitory computer-readable storage medium of claim 5, the acts further comprising determining that a plurality of network nodes are associated with the generic IP address, the plurality of network nodes not enabled for the network communications.

10. The non-transitory computer-readable storage medium of claim 5, the acts further comprising receiving a third indication that the network node is configured for wireless network communication based at least in part on the at least one commissioning file.

11. The non-transitory computer-readable storage medium of claim 5, the acts further comprising:
 associating the port of the aggregation network node with an installation location of the network node; and
 determining the at least one commissioning file based on design data associated with the installation location of the network node.

12. The non-transitory computer-readable storage medium of claim 5, wherein the network node is a wireless base station configured to provide wireless communications to a plurality of client devices.

13. The non-transitory computer-readable storage medium of claim 5, the acts further comprising addressing the at least one commissioning file to the port of the aggregation network node without indicating the generic IP address of the network node.

14. The non-transitory computer-readable storage medium of claim 5, the acts further comprising:
 receiving a third indication of the public IP address of the network node;
 associating, as associated information, the public IP address of the network node with the port of the aggregation network node and an installation location of the network node; and
 updating a database with the associated information.

15. A computer-implemented method comprising:
 receiving a first indication that a network node is coupled to a port of an aggregation network node, the network node associated with a generic Internet protocol (IP) address, wherein the generic IP address is a private IP address, wherein the generic IP address is assignable to the network node and a second network node at the same time;
 determining at least one commissioning file to provide to the network node;
 transmitting the at least one commissioning file to the aggregation network node associated with the network node;
 receiving a second indication that the network node has updated an address of the network node from the generic IP address to a public address to enable network communications based at least in part on the at least one commissioning file; and
 communicating with the network node via the aggregation network node to provide network communications.

16. The computer-implemented method of claim 15, further comprising determining that a plurality of network nodes are associated with the generic IP address, the plurality of network nodes not enabled for the network communications.

17. The computer-implemented method of claim 15, further comprising receiving a third indication that the network node is configured for wireless network communication based at least in part on the at least one commissioning file.

18. The computer-implemented method of claim 15, further comprising:
 associating the port of the aggregation network node with an installation location of the network node; and
 determining the at least one commissioning file based on design data associated with the installation location of the network node.

19. The computer-implemented method of claim 15, further comprising addressing the at least one commissioning file to the port of the aggregation network node without indicating the generic IP address of the network node.

20. The computer-implemented method of claim 15, further comprising:
 receiving a third indication of the public IP address of the network node;
 associating, as associated information, the public IP address of the network node with the port of the aggregation network node and an installation location of the network node; and
 updating a database with the associated information.

* * * * *